United States Patent
Fujinaka

(10) Patent No.: US 7,327,064 B2
(45) Date of Patent: Feb. 5, 2008

(54) BRUSHLESS MOTOR

(75) Inventor: Hiroyasu Fujinaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 373 days.

(21) Appl. No.: 10/980,464

(22) Filed: Nov. 3, 2004

(65) Prior Publication Data
US 2005/0179335 A1 Aug. 18, 2005

(30) Foreign Application Priority Data
Feb. 16, 2004 (JP) .............................. 2004-038224

(51) Int. Cl.
H02K 1/16 (2006.01)
H02K 1/17 (2006.01)
H02K 1/26 (2006.01)

(52) U.S. Cl. ...................................... 310/216; 310/254

(58) Field of Classification Search ................ 310/216, 310/254, 269
See application file for complete search history.

(56) References Cited
U.S. PATENT DOCUMENTS
5,578,883 A * 11/1996 Sakashita et al. ............. 310/91
6,320,288 B1 * 11/2001 Suzuki et al. ............. 310/68 B FOREIGN PATENT DOCUMENTS
| JP | 3-70461 | 3/1991 |
|---|---|---|
| JP | 9-285047 | 10/1997 |
| JP | 2001-16806 | 1/2001 |
| JP | 200106806 A * | 1/2001 |

* cited by examiner

Primary Examiner—Tran Nguyen
(74) Attorney, Agent, or Firm—RatnerPrestia

(57) ABSTRACT

A brushless motor includes a rotor having a permanent magnet magnetized N pole and S pole alternately in a rotary direction, and a stator having a core facing the permanent magnet in a radial direction and a bearing which rotatably supports the rotor. The core includes plural salient poles at its ends, and slot inclusive-angle A, slot inclusive-angle B, slot inclusive-angle C are available between the salient poles adjacent to each other. When a relation of A<B<C is found, those slot inclusive-angles vary multilevel along the rotary direction in the sequence of A-B-C-B-A-. This structure allows the rotor to be urged always in a radial direction by a lateral pressure, so that the brushless motor with a fewer vibrations and a more accurate rotation is obtainable at a lower cost.

14 Claims, 11 Drawing Sheets

BRUSHLESS MOTOR

FIELD OF THE INVENTION

The present invention relates to a disc-driving brushless motor (spindle motor) to be used in magnetic disc devices or optical disc devices.

BACKGROUND OF THE INVENTION

Magnetic disc devices and optical disc devices have increased their speeds as well as capacities year by year, so that disc-driving spindle motors have been required not only to increase the speed and torque but also to decrease vibrations and noises.

For instance, a rewritable DVD sometimes undergoes a write at a high speed such as max. 6000 rpm, so that a slight vibration of the disc causes a miss. The spindle motor, which drives discs, is thus required in particular to reduce vibrations.

With respect to reducing vibrations of spindle motors (reducing the vibrations particularly in a radial direction), a hydrodynamic bearing is used mainly in fixed magnetic disc devices instead of a ball bearing conventionally used. The hydrodynamic bearing allows holding a shaft in a radial direction with a strong fluid-film in a non-contact state, so that vibrations can be reduced. This method has been widely accepted.

There is another method proposed, i.e. a bearing per se employs a sintered oilless bearing; however, its core shapes asymmetric, thereby producing a lateral pressure urging the rotor always in a radial direction. As a result, wobbles of the shaft are suppressed, and vibrations can be reduced.

A method employing the hydrodynamic bearing is disclosed in Japanese Patent Application Non-Examined Publication No. H09-285047, and a method employing the asymmetric core is disclosed in Japanese Patent Application Non-Examined Publication No. 2001-16806. The method of employing the hydrodynamic bearing needs to provide the bearing with extremely accurate machining, so that the bearing becomes costly and the motor tends to be expensive.

The latter method using the asymmetric core does not need special components at all, so that the cost can be lowered; however unexpected vibrations caused by the asymmetric core tend to occur, so that few products have been commercialized yet.

SUMMARY OF THE INVENTION

The present invention addresses the problems discussed above, and aims to provide a brushless motor of which bearing has a core asymmetrically structured by an improved method. The brushless motor comprises the following elements:

a rotor including permanent magnets magnetized N pole and S pole alternately in the rotary direction;
  a stator including a core facing the permanent magnets in the rotary direction and wound with coils, and a bearing which rotatably supports the rotor.

The core has plural salient poles at its ends. An angle included by salient poles adjacent to each other, i.e. an angle inclusive of a slot, or an angle included by both tips of a salient pole, i.e. an angle inclusive of a salient pole has a small inclusive-angle, a medium inclusive-angle or a large inclusive-angle. The medium inclusive-angle is disposed between the small and large angles, so that a lateral pressure is produced for urging the rotor in a radial direction.

To be more specific, angles included by adjacent salient poles, i.e. angles inclusive of a slot form slot inclusive-angles A, B and C, and the relation of A<B<C is found, then the slot inclusive-angle changes multilevel in the sequence of A-B-C-B-A-.

Another specific instance is available, i.e. angles included by tips of salient poles form salient-pole inclusive-angle P, salient-pole inclusive-angle Q, and salient-pole inclusive-angle R, and the relation of P<Q<R is found, then the salient-pole-tips inclusive-angle changes multilevel in the sequence of P-Q-R-Q-P-.

The structures discussed above allows dispersing unevenness of the core shape in the circumferential direction, so that the vibrations caused by the asymmetric core can be minimized. Cores deviated by a given angle from each other are appropriately combined for canceling cogging torque within a motor, so that an absolute value of the cogging torque can be suppressed to a lower level.

A change in only the core shape can produce lateral pressure urging the rotor always in the radial direction, thereby suppressing wobbles of the shaft to a lower level. As a result, this simple change in the structure allows obtaining a brushless motor having a fewer vibrations at a lower cost.

DETAILED DESCRIPTION OF PREFERRED EMBODIMENTS

Exemplary embodiments of the present invention are demonstrated hereinafter with reference to the accompanying drawings.

Exemplary Embodiment 1

Figure 1:
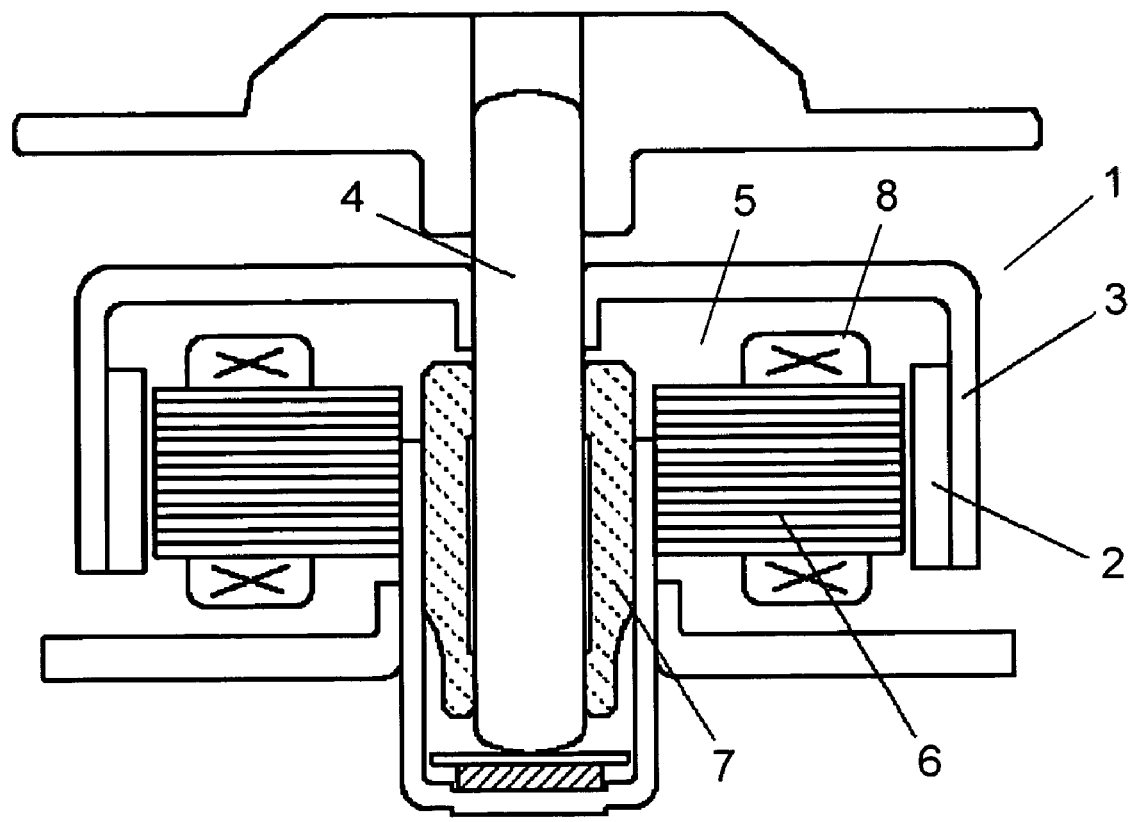
FIG. 1 shows a sectional view illustrating a structure of a brushless motor in accordance with a first exemplary embodiment of the present invention.

FIG. 1 shows a sectional view illustrating a structure of a brushless motor in accordance with the first exemplary embodiment of the present invention. In FIG. 1, ring-shaped permanent magnet 2 are magnetized N pole and S pole alternately in total, e.g. 12 poles in the rotary direction, and rigidly bonded to an inner wall of rotor frame 3 which is shaped like a cup by press forming an iron sheet. Shaft 4 is press-fitted at a center section of rotor frame 3. Those components discussed above form rotor 1.

Shaft 4 is held rotatably by sintered oilless bearing 7 that is formed by impregnating lubricant into porous sintered alloy. Core 6 is disposed to the inner wall of rotor 6, which faces permanent magnet 2 with an annular space in between and forms a magnetic circuit, and are wound with coil 8. Those components discussed above form stator 5.

According to the foregoing structure, supply of power to coil 8 in response to a position of rotor 1 rotates rotor 1.

The sintered oilless bearing employed in this embodiment can be formed in series by a tooling die, and the bearing can be inexpensive and rather long wearing, so that it can be generally used in compact-size motors employed in information devices as well as audio-video devices.

However, the sintered oilless bearing has a weak oil-film supporting the shaft, so that the shaft wobbles in the clearance between the bearing and the shaft. As a result, irregular vibrations tend to occur, which causes the motor to vibrate awkwardly.

Figure 2:
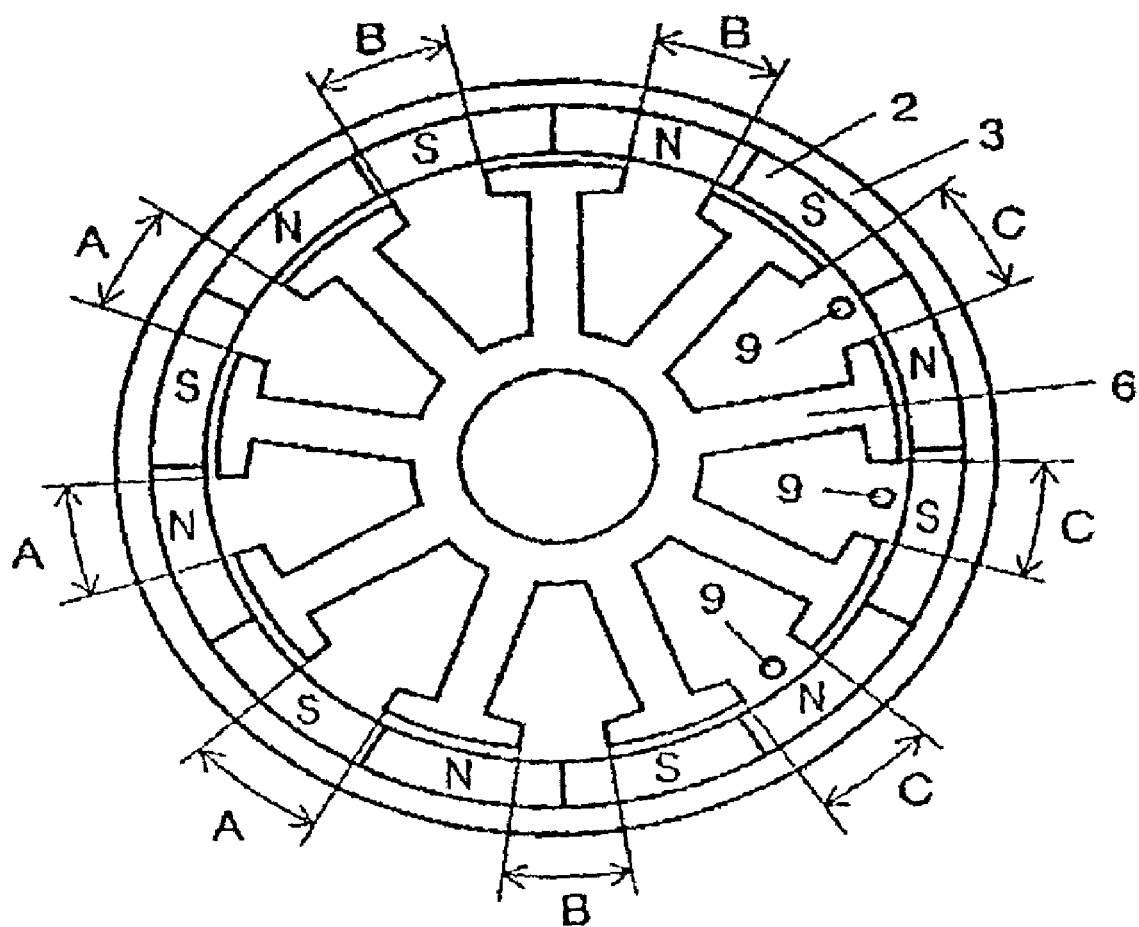
FIG. 2 shows a shape of a core in accordance with the first exemplary embodiment of the present invention.

The first embodiment thus devises a shape of core 1 for producing a lateral pressure in order to suppress the wobbling of the shaft. FIG. 2 shows a core shape in accordance with the first embodiment. In FIG. 2, slot inclusive-angles which are radial angles of the slot openings are not uniform, and there are three different inclusive-angles, namely, the relation of slot inclusive-angle A<slot inclusive-angle B<slot inclusive-angle C is found. Those three kinds of slot inclusive-angles are arranged clockwise from the left in the sequence of A-B-B-C-C-C-B-A-A- as shown in FIG. 2. To be more specific, the slot inclusive-angle varies multi-level such as small-medium-large-medium-small-. In other words, a medium inclusive-angle is disposed between a small inclusive-angle and a large inclusive-angle.

Figure 3A:
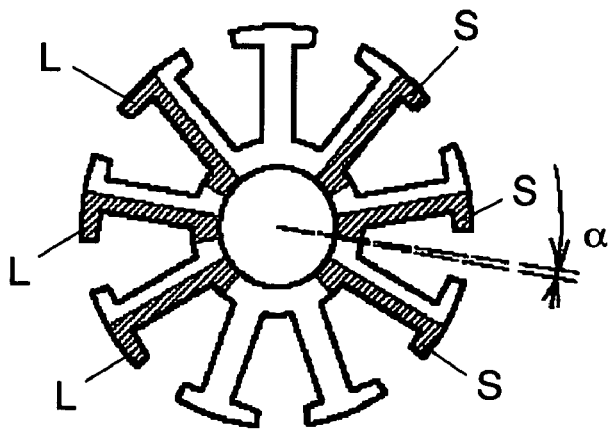
FIGS. 3A, 3B, 3C schematically show a method of forming the core in accordance with the first exemplary embodiment of the present invention.
Figure 3B:
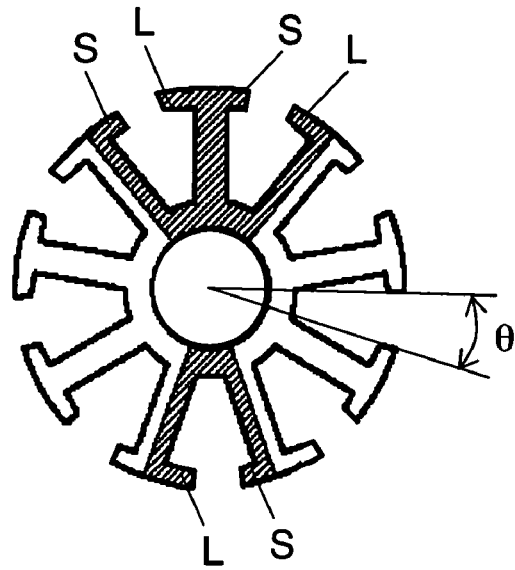
Figure 3C:
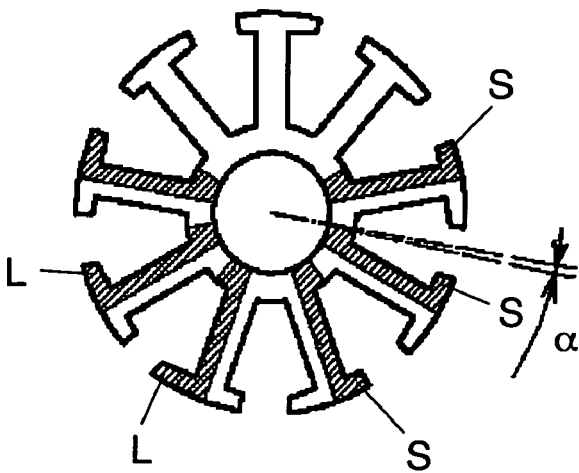

FIGS. 3A, 3B, 3C schematically show a method of forming the core shape shown in FIG. 2. Assume that a basic core shape having a uniform slot inclusive-angle θ. Then three types of core shapes are formed by deviating a slot position from the basic core shape by a given angle α, and those three shapes are combined at shadow sections, i.e. one third of each shape, so that the core shape shown in FIG. 2 is formed. In FIGS. 3A-3C, tips marked with "S" of salient poles are smaller than the basic shape by angle α. Tips marked with "L" of salient poles are larger than the basic shape by angle α. Combination of those three kinds of core shapes forms the core shape shown in FIG. 2. Each one of the foregoing slot inclusive-angles is described with the following equation:

$A = θ - 2α$ $B = θ$ $C = θ + 2α$

Asymmetric slots inclusive-angles as described above produce a lateral pressure urging rotor 1 always in a radial direction because the attraction forces of permanent magnet 2 and core 6 differ at both their sides (Attraction forces of permanent magnet 2 and core 6 are different in parts.) The lateral pressure urges shaft 4 in a direction within the clearance between bearing 7 and shaft 4 while shaft 4 rotates, so that the wobbling of shaft 4 is suppressed. As a result, rotating accuracy of the motor is improved.

Multilevel changes of the slot inclusive-angle demonstrated in this embodiment can suppress the adverse affect of the asymmetric core shape. Next, the suppression of the adverse affect is detailed hereinafter.

Figure 4:
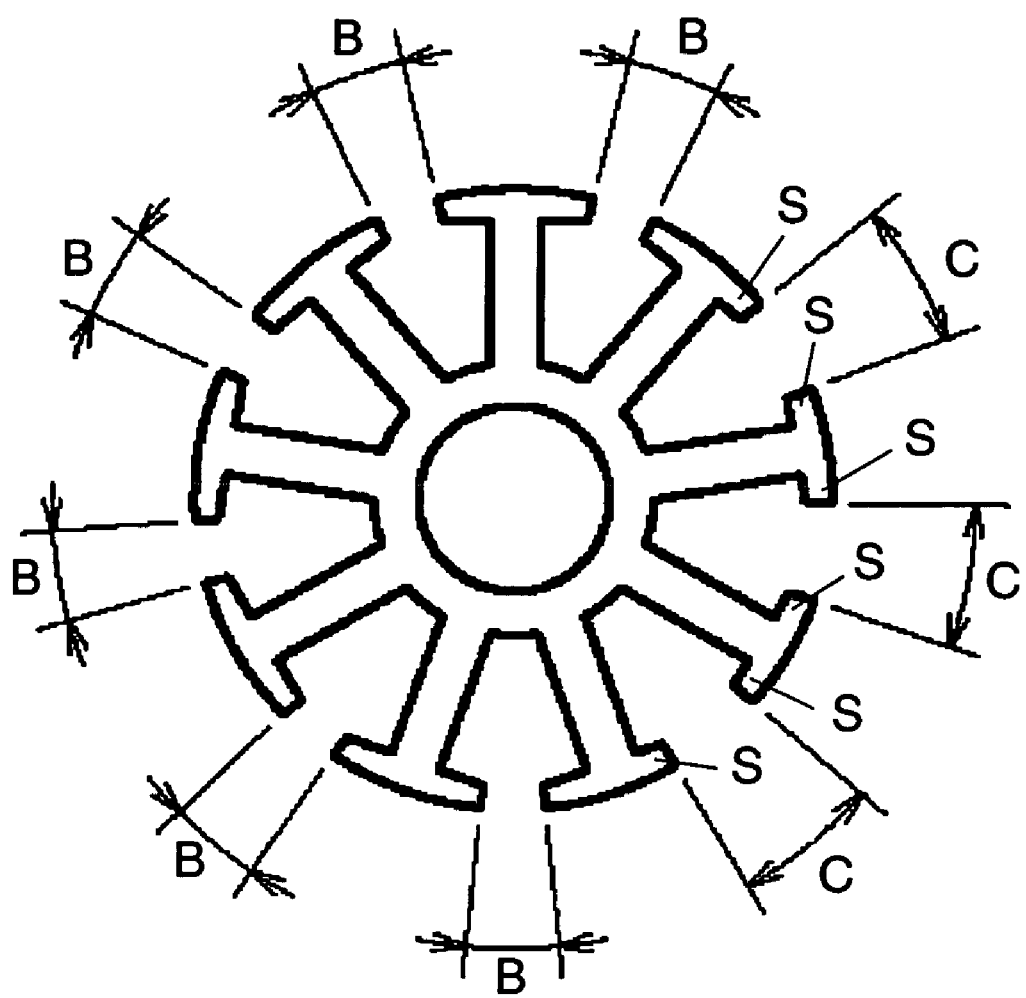
FIG. 4 shows a shape of a core as a comparison with that in accordance with the first embodiment.

FIG. 4 shows a core formed of two kinds of slots inclusive-angles, i.e. slot inclusive-angles A and B, for comparison purposes. Tips marked with "S" of salient poles are cut off, and nine slot inclusive-angles in total are formed, namely, six slot inclusive-angles B and three slot inclusive-angles C, and they are placed clockwise from the left in the sequence of B-B-B-C-C-C-B-B-B. In this core shape, attraction forces of the permanent magnet and the core differ at the right and the left, so that a lateral pressure urging rotor 1 in a radial direction is produced. As a result, the wobbling of the shaft is suppressed. This is the same phenomenon as described in the embodiment 1. However, when the behavior of the lateral pressure is studied in detail, it is found that the lateral pressure at the core shape shown in FIG. 2 behaves totally different from that at the core shape shown in FIG. 4.

In order to study the lateral pressure, magnetic field is analyzed by the finite element method for studying in detail how the lateral pressure changes in response to the spin of the rotor. A target model of analysis is a spindle motor to be used in a DVD, and the motor has dimensions of outer diameter=20.4 mm, core lamination thickness=4.55 mm.

Figure 5A:
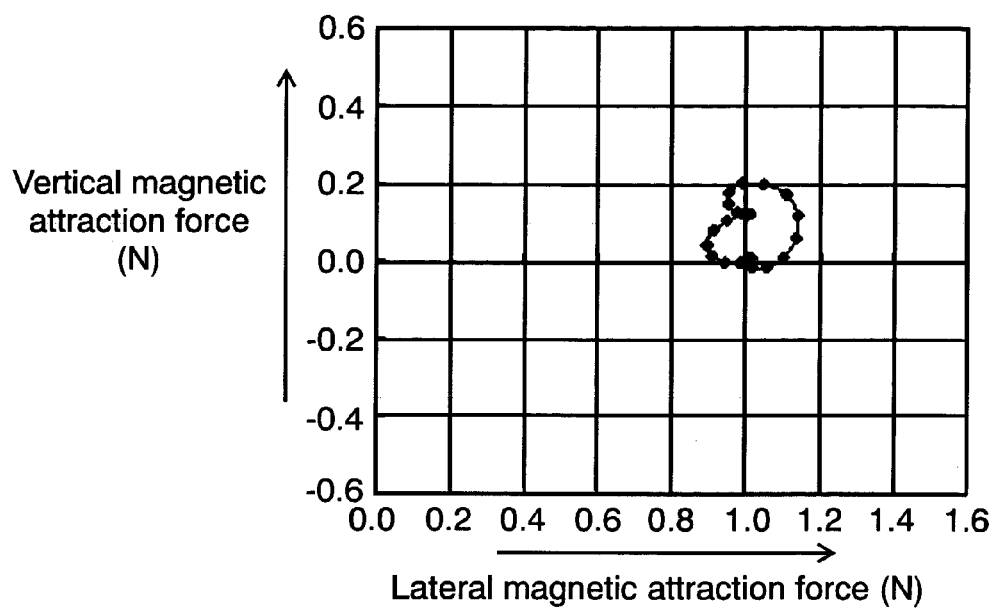
FIG. 5A shows behavior of a lateral pressure in accordance with the first exemplary embodiment of the present invention.
Figure 5B:
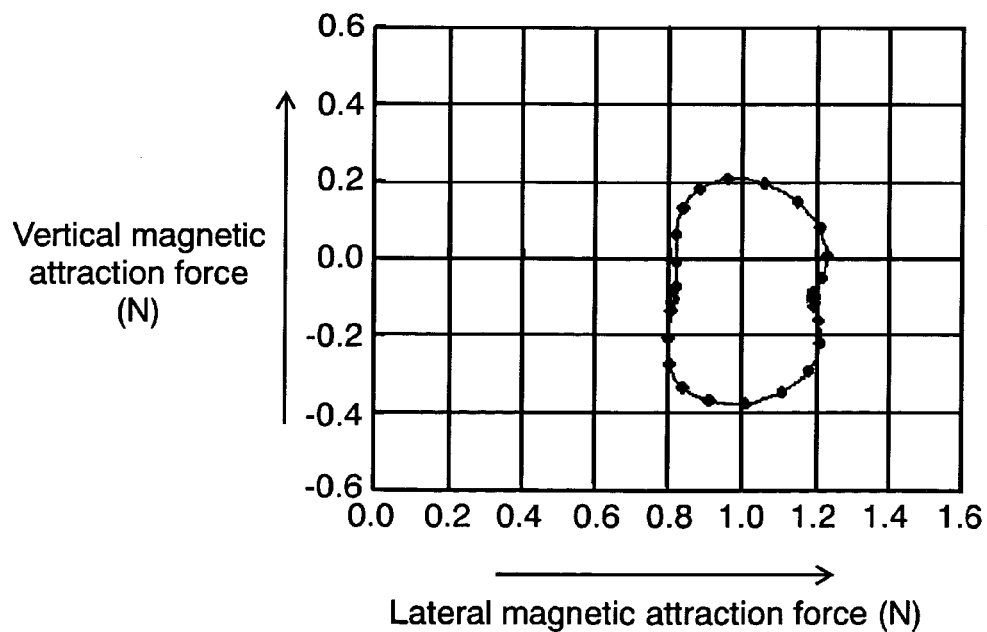
FIG. 5B shows behavior of a lateral pressure of the comparison.

FIGS. 5A and 5B show the behavior of the lateral pressure, which behavior is found by the magnetic field analysis. FIG. 5A shows the case of the core shape used in this first embodiment shown in FIG. 2, and FIG. 5B shows the case of the core shape shown in FIG. 4. The lateral axes of both the drawings represent magnetic attraction force in a lateral direction, and the vertical axes represent magnetic attraction force in a vertical direction. The unit used in the drawings is N (Newton).

The lateral pressures shown in FIGS. 5A and 5B change in their magnitudes and directions in a cycle of once in 12 rotations. This number of rotations, i.e. 12, agrees with the number of magnetized poles of the permanent magnet. Comparison of FIG. 5A with FIG. 5B explicitly tells that the change in the lateral pressure of the core shape of the present invention shown in FIG. 5A is substantially smaller than the changes in the core shape, of which slots are cut off only in parts, shown in FIG. 5B.

In the case of the core shape of which slots are cut off only in parts, attraction force changes greatly in sections where a slot width changes, and this change in the attraction force appears as a change in the lateral pressure. On the other hand, in the case of the core shape of the present invention, multilevel changes of slot widths allow reducing a change in slot width at respective positions. On top of that, the positions where the slot widths change are dispersedly placed along the rotary direction, so that the changes in the attraction force are dispersed along the rotary direction. As a result, the lateral pressure as a whole can be suppressed to a lower level.

The changes in the lateral force applies the force vibrating rotor 1 in the radial direction, so that the motor sometimes produces extra vibrations; however, use of core 6 of the present invention can substantially suppress such vibrations.

Adoption of an appropriate value as the slot inclusive-angle of the basic core shape and a deviated angle α of the shape to be combined cancels cogging torque within a motor, thereby suppressing an absolute value of the cogging torque to a lower level. This advantage can reduce jitters (changes in rpm) of the motor.

A specific instance of the first embodiment is this: slot inclusive-angle of the basic core=90° in electrical angles; deviation angle of the core shapes to be combined=10° in electrical angles. This structure, i.e. only a core-shape is changed, allows producing a lateral pressure that urges rotor 1 always along a radial direction, thereby suppressing wobbles of the shaft. At the same time, cogging torque and jitters can be reduced. As a result, a motor featuring the foregoing advantages is obtainable at an inexpensive cost.

FIG. 2 shows position detector 9 for detecting a pole position of permanent magnet 2. Three Hall elements are used in general as this position detector 9. In this embodiment, since three slots C having a large inclusive-angle are placed in series on the right, the position detector can be placed at this place, so that the space can be used efficiently.

Exemplary Embodiment 2

Figure 6:
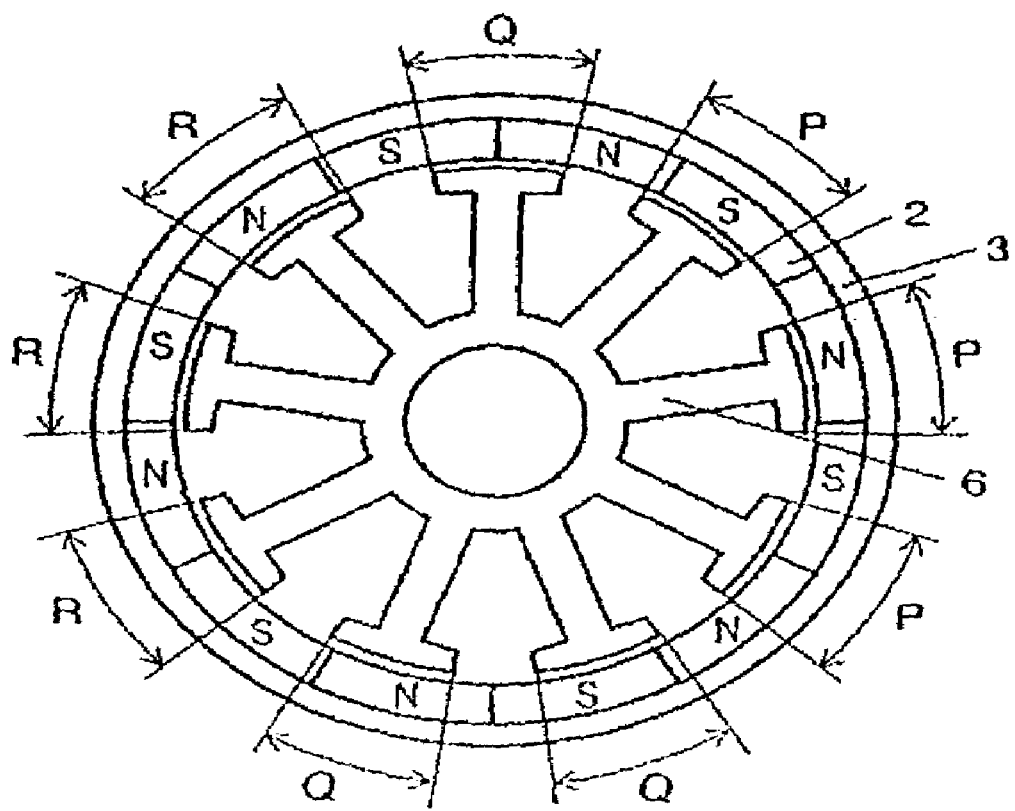
FIG. 6 shows a core shape in accordance with a second exemplary embodiment of the present invention.

FIG. 6 shows a core shape in accordance with the second exemplary embodiment of the present invention. In this embodiment, angles included by tips of respective salient poles and being inclusive of a salient pole are not uniform, but three different inclusive angles are available. To be more specific, a relation of salient-pole inclusive-angle P<salient-pole inclusive-angle Q<salient-pole inclusive-angle R is found. Those three kinds of salient-pole inclusive-angles are arranged as shown in FIG. 6, namely, in the sequence of P-Q-Q-R-R-R-Q-P-P- from the right clockwise. In other words, the inclusive-angle changes multilevel in the sequence of small-medium-large-medium-small-, namely, a medium inclusive-angle is disposed between a small inclusive-angle and a large inclusive-angle.

Figure 7A:
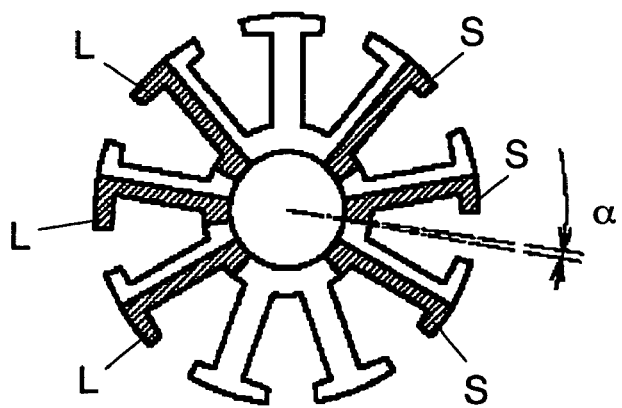
FIGS. 7A, 7B, 7C schematically illustrate a method of forming the core shape in accordance with the second exemplary embodiment of the present invention.
Figure 7B:
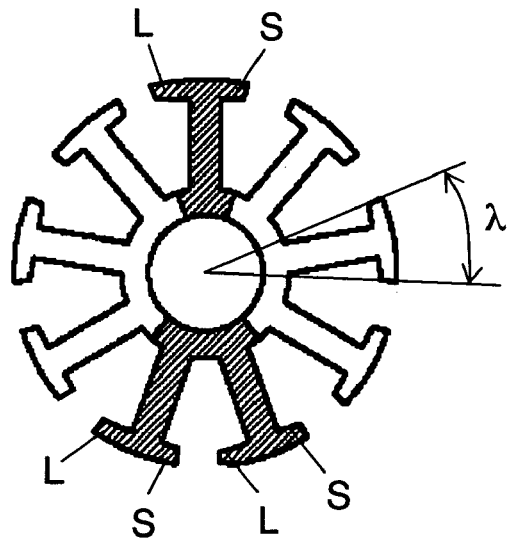
Figure 7C:
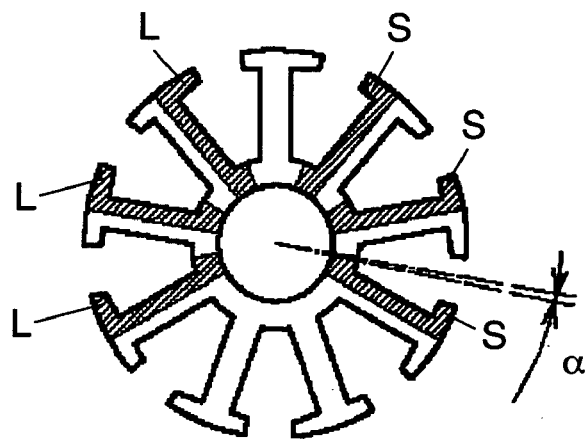

FIGS. 7A, 7B, and 7C schematically show a method of forming the core shape shown in FIG. 6. Assume that a basic core shape having a uniform salient-pole inclusive-angle λ. Then three types of core shapes are formed by deviating a tip position from the basic core shape by a given angle α, and those three shapes are combined at shadow sections, i.e. one third of each shape are combined, so that the core shape shown in FIG. 6 is formed. In FIGS. 7A-7C, tips marked with "S" of salient poles are smaller than the basic shape by angle α. Tips marked with "L" of salient poles are larger than the basic shape by angle α. Combination of those three kinds of core shapes forms the core shape shown in FIG. 6. Each one of the foregoing salient-pole inclusive-angles is described with the following equation:

$P=\lambda-2\alpha$ $Q=\lambda$ $R=\lambda+2\alpha$

The difference between the core shape of the previous first embodiment and this second embodiment is that the slots inclusive-angle is used as a reference or the salient pole inclusive-angle is used as a reference. Both the methods obtain the advantages similar to each other.

In the case of using the core shape shown in FIG. 6 of the second embodiment, there are only two slots that have the largest slots inclusive-angles. Each one of those two slots is placed between the salient poles having a small salient-pole inclusive-angle on the right end. Position detectors for detecting positions of the permanent magnet are placed in the quantity of three in general, so that they can be suitably disposed at the place shown in FIG. 2 of the first embodiment.

Exemplary Embodiment 3

The foregoing first and second embodiments discuss the case where the number of magnetic poles is 12 and the number of salient poles of the core is 9. The third and fourth embodiments described hereinafter will discuss the case where the number of magnetic poles 16 and the number of salient poles of the core is 12.

Figure 8:
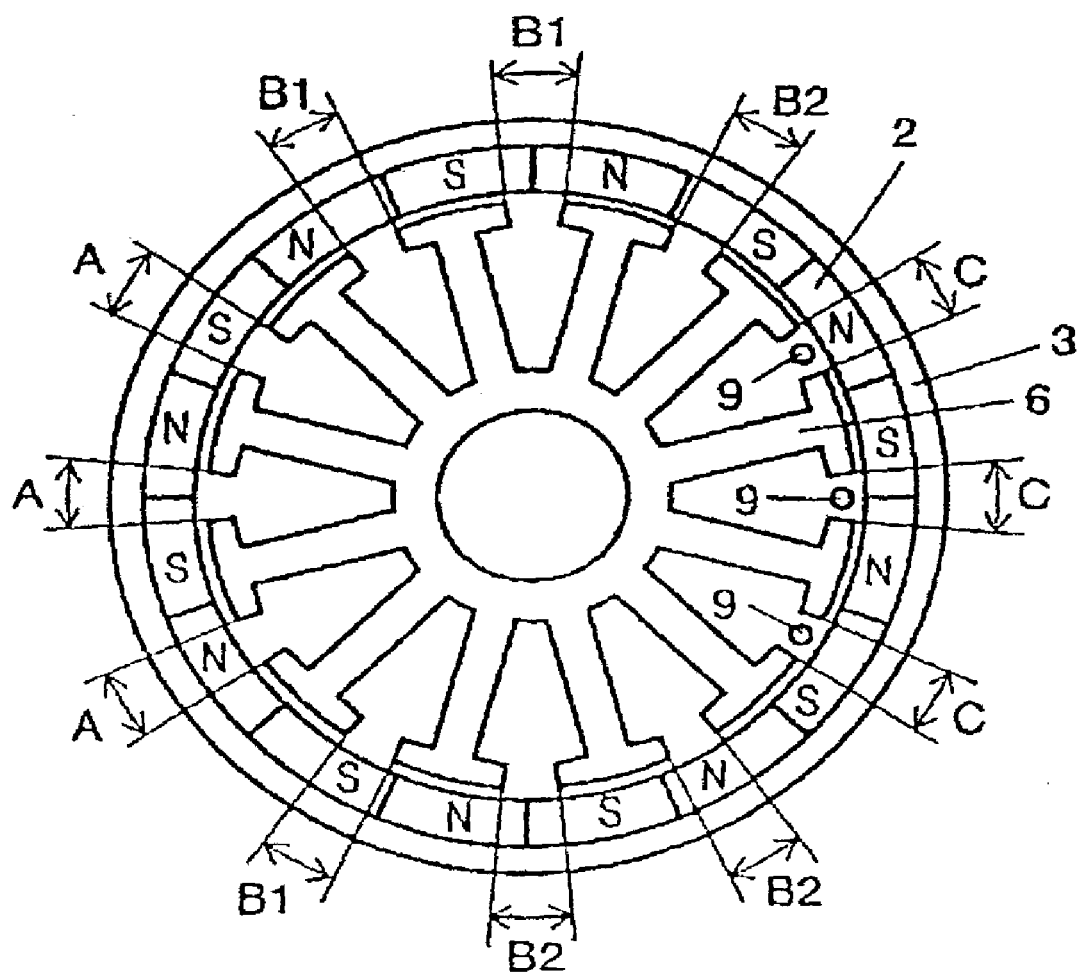
FIG. 8 shows a core shape in accordance with a third exemplary embodiment of the present invention.
Figure 9A:
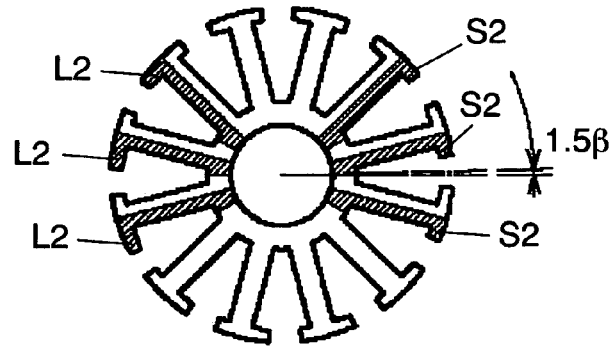
FIGS. 9A, 9B, 9C and 9D schematically illustrate a method of forming the core shape in accordance with the third exemplary embodiment of the present invention.
Figure 9B:
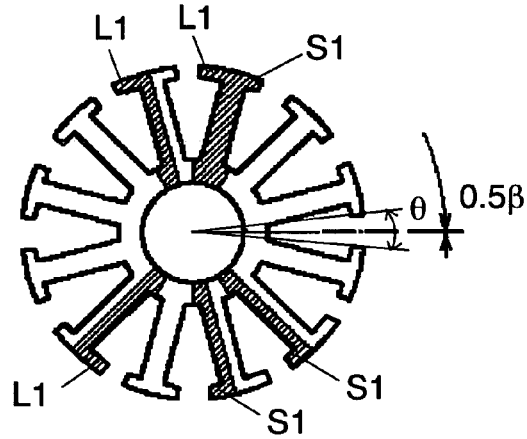
Figure 9C:
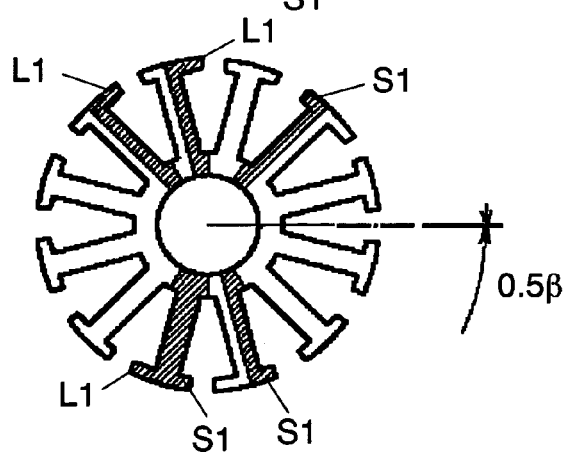
Figure 9D:
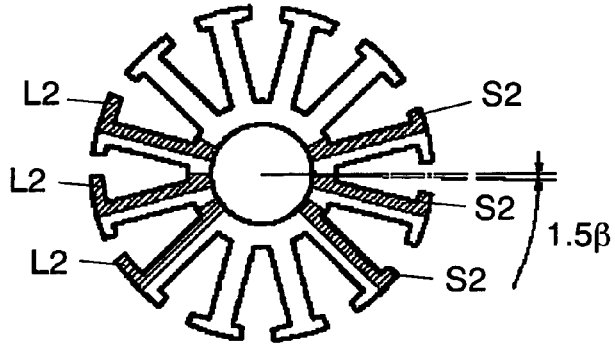

FIG. 8 shows a core shape in accordance with the third embodiment. In FIG. 8, slot inclusive-angles, which are radial angles of the slot openings, are not uniform, and there are four different slot inclusive-angles, namely, the relation of slot inclusive-angle A<slot inclusive-angle B1<slot inclusive-angle B2<slot inclusive-angle C is found. Those four kinds of slot inclusive-angles are arranged clockwise from the left in the sequence of A-A-B1-B1-B2-C-C-C-B2-B2-B1-A- as shown in FIG. 8. To be more specific, the slot inclusive-angle varies multi-level such as small-medium small-medium large-large-medium large-medium small-small-. In other words, slot inclusive-angle B1 (medium small) is disposed adjacent to slot inclusive-angle A (small), and slot inclusive-angle B2 (medium large) is disposed adjacent to slot inclusive-angle C (large).

FIGS. 9A, 9B, 9C and 9D schematically show a method of forming the core shape shown in FIG. 8. Assume that a basic core shape having a uniform slot inclusive-angle θ. Then four types of core shapes are formed by deviating a slot position from the basic core shape by given angles +1.5 β, +0.5 β, −0.5 β, −1.5 β, and those four shapes are combined at shadow sections, i.e. one fourth of each shape, so that the core shape shown in FIG. 8 is formed. In FIGS. 9A-9D, tips marked with "S1" of salient poles are smaller than the basic shape by angle 0.5 β. Tips marked with "S2" of salient poles are smaller than the basic shape by angle 1.5 β. Tips marked with "L1" of salient poles are larger than the basic shape by angle 0.5 β. Tips marked with "L2" of salient poles are larger than the basic shape by angle 1.5 β. Combination of those four kinds of core shapes forms the core shape shown in FIG. 8. Each one of the foregoing slot inclusive-angles is described with the following equation:

$A=\theta-3\beta$ $B1=\theta-\beta$ $B2=\theta+\beta$ $C=\theta+3\beta$

The core shape in accordance with the third embodiment produces a greater advantage than the first and second embodiments. The advantage disperses the attraction force changes, which is caused by the slot-width change, in the rotary direction. Therefore, the change in lateral pressure can be suppressed to the lower level. As such, the motor having the greater number of slots can form a brushless motor with fewer vibrations and a smaller change in the lateral pressure by dividing the changes of slot-width into a greater number of multilevel.

In this third embodiment, since slot inclusive-angles C are arranged in the quantity of three on the right-hand side similar to the first embodiment, position detector 9 can be placed at this position.

Exemplary Embodiment 4

Figure 10:
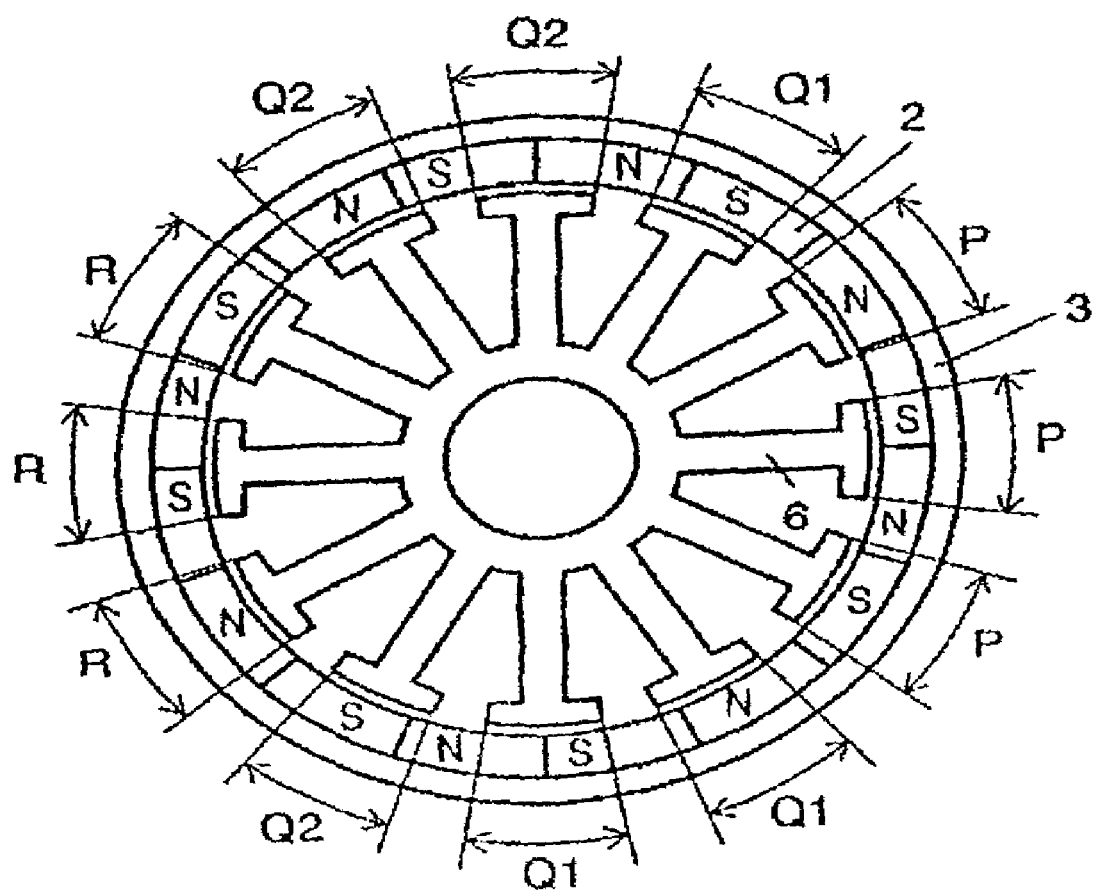
FIG. 10 shows a core shape in accordance with a fourth exemplary embodiment of the present invention.
Figure 11A:
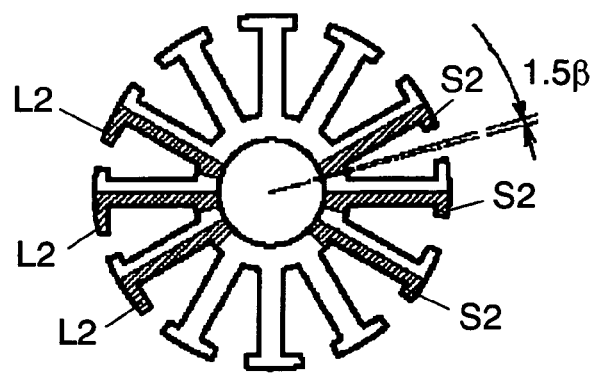
FIGS. 11A, 11B, 11C and 11D schematically illustrate a method of forming the core shape in accordance with the fourth exemplary embodiment of the present invention.
Figure 11B:
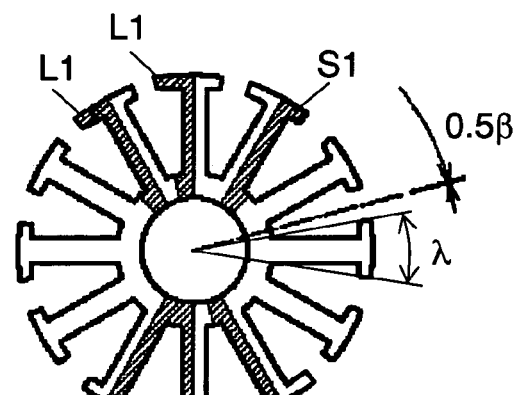
Figure 11C:
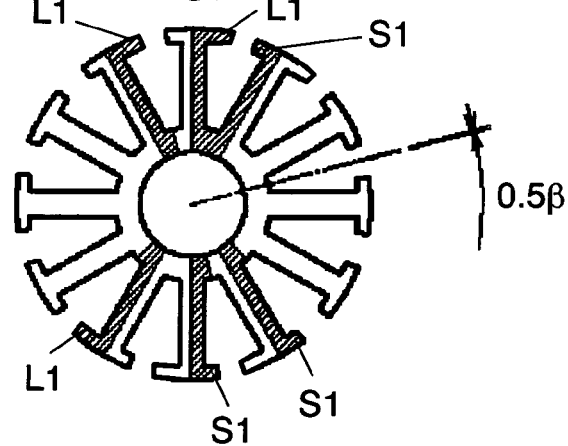
Figure 11D:
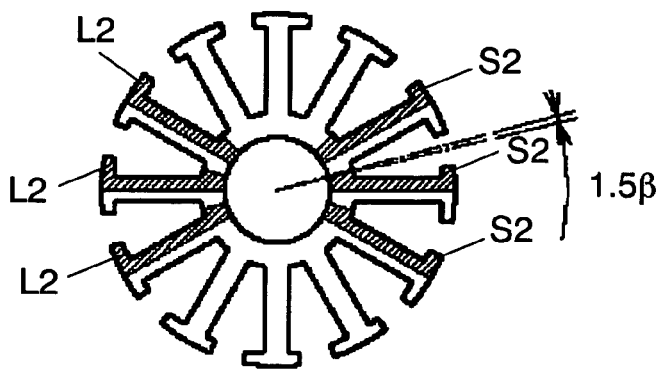

FIG. 10 shows a core shape in accordance with the fourth exemplary embodiment of the present invention. In this embodiment, angles included by tips of respective salient poles and being inclusive of a salient pole are not uniform, but four different salient-pole inclusive angles are available. To be more specific, a relation of salient-pole inclusive-angle P<salient-pole inclusive-angle Q1<salient-pole inclusive-angle Q2<salient-pole inclusive-angle R is found. Those four kinds of inclusive-angles are arranged as shown in FIG. 10, namely, in the sequence of P-P-Q1-Q1-Q2-R-R-R-Q2-Q2-Q1-P- from the right clockwise. In other words, the inclusive-angle changes multilevel in the sequence of small-medium small-medium large-large-medium large-medium small-small-. To be more specific, inclusive-angle Q1 (medium small) is adjacent to inclusive-angle P (small), and inclusive-angle Q2 (medium large) is adjacent to inclusive-angle R (large).

FIGS. 11, 11B, 11C, and 11D schematically show a method of forming the core shape shown in FIG. 10. Assume that a basic core shape having a uniform salient-pole inclusive-angle $\lambda$. Then four types of core shapes are formed by deviating a tip position from the basic core shape by given angles $+1.5\beta$, $+0.5\beta$, $-0.5\beta$, $-1.5\beta$, and those four shapes are combined at shadow sections, i.e. one fourth of each shape are combined, so that the core shape shown in FIG. 10 is formed. In FIGS. 11A-11D, tips marked with "S1" of salient poles are smaller than the basic shape by angle $0.5\beta$. Tips marked with "S2" of salient poles are smaller than the basic shape by angle $1.5\beta$. Tips marked with "L1" of salient poles are larger than the basic shape by angle $0.5\beta$. Tips marked with "L2" of salient poles are larger than the basic shape by angle $1.5\beta$. Combination of those four kinds of core shapes forms the core shape shown in FIG. 10. Each one of the foregoing salient-pole inclusive-angles is described with the following equation:

$$P=\lambda-3\beta$$

$$Q1=\lambda-\beta$$

$$Q2=\lambda+\beta$$

$$R=\lambda+3\beta$$

The difference between the core shape of the previous third embodiment and this fourth embodiment is that the slots inclusive-angle is used as a reference or the salient pole inclusive-angle is used as a reference. Both the methods obtain the advantages similar to each other.

The previous first and second embodiments discuss the case where the number of magnetic poles is 12 and the number of salient poles of the core is 9. The foregoing third and fourth embodiments discuss the case where the number of magnetic poles 16 and the number of salient poles of the core is 12. Regardless of the number of magnetic poles or salient poles, the slot inclusive-angles or the salient pole inclusive-angles are arranged along the rotary direction such that those angles vary in multilevel of small-medium-large-medium-small. This structure makes magnetic attraction force different on the right and the left of the core, so that rotor 1 is always urged along a radial direction by a lateral force. As a result, a brushless motor with a fewer vibrations is obtainable.

A basic core shape having a uniform slot inclusive-angle is formed. Then a position of "n" pieces ("n" is an integer not less than 3) of slots is deviated from the basic core shape by a given angle, and those "n" core shapes are combined at one "n"th of each shape. Cogging torque within the motor can be thus cancelled and is suppressed to a lower level. As a result, a brushless motor with smaller jitters is obtainable. The previous embodiments discuss the cases where "n" is 3 and 4; however, a case of "n" not less than 4 is applicable to a similar structure discussed above and can produce a similar advantage.

Slot inclusive-angles of a core are not uniform, but they are grouped into plural values of angle such that cogging torque components generated within a brushless motor can be cancelled each other. This structure also can suppress the cogging torque to a lower level, and provides the brushless motor with smaller jitters.

In the previous embodiments, an outer-rotor motor, i.e. a core is disposed inside and a rotor is disposed outside, is used; however, an inner rotor motor, a core is disposed outside and a rotor is disposed inside, is also applicable to the embodiments.

The previous embodiments use a ring-shaped permanent magnet magnetized multi-pole is used as a part of the rotor; however, plural permanent magnets split into respective magnetic poles or interior permanent magnets buried in slots provided at a rotor yoke can be used with a similar advantage.

What is claimed is:

1. A brushless motor comprising:
   a rotor including a permanent magnet magnetized N pole and S pole alternately in a rotary direction;
   a stator including a core facing the permanent magnet in a radial direction and wound with a coil, and a bearing rotatably supporting the rotor,
   wherein the permanent magnet has 12 magnetic poles, and the core has 9 salient poles,
   wherein the core has the salient poles at its ends, and ones of slot inclusive-angles of salient poles adjacent to each other have slot inclusive angle A, slot inclusive angle B, and slot inclusive angle C, and
   wherein, when a relation of A<B<C is found, the slot inclusive angles in one cycle of the core are arranged in the sequence of A-B-B-C-C-C-B-A-A-for producing a lateral pressure urging the rotor along a radial direction.

2. The brushless motor as defined in claim 1, wherein the core has a basic core shape having a uniform slot inclusive-angle $\theta$, and the salient poles deviate from the basic core shape by a given angle $\alpha$, and the slot inclusive-angle A, the slot, inclusive-angle B, and the slot inclusive-angle C, meet equations below:

$$A=\theta-2\alpha$$

$$B=\theta$$

$$C=\theta=2\alpha.$$

3. The brushless motor as defined in claim 1, wherein a position detector for detecting the magnetic poles of the permanent magnet is disposed at a position of the slot inclusive-angle C.

4. The brushless motor as defined in claim 1, wherein the bearing is a sintered oilless bearing.

5. A brushless motor comprising:
   a rotor including a permanent magnet magnetized N pole and S pole alternately in a rotary direction;

a stator including a core facing the permanent magnet in a radial direction and wound with a coil, and a bearing rotatably supporting the rotor, wherein the permanent magnet has 12 magnetic poles, and the core has 9 salient poles, wherein the core has the salient poles at its ends, and the salient poles have a salient-pole inclusive-angle P, a salient-pole inclusive-angle Q, and a salient-pole inclusive-angle R, and wherein when a relation of P<Q<R is found, the salient-pole inclusive-angles in one cycle of the core are arranged in the sequence of P-Q-Q-R-R-R-Q-P-P- for producing a lateral pressure urging the rotor along a radial direction.

6. The brushless motor as defined in claim 5, wherein the core has a basic core shape having a uniform salient-pole inclusive-angle λ, and the salient poles deviate from the basic core shape by a given angle α, and the salient-pole inclusive-angle P, the salient-pole inclusive-angle Q, and the salient-pole inclusive-angle R, meet equations below:

$P=\lambda-2\alpha$ $Q=\lambda$ $R=\lambda+2\alpha.$

7. The brushless motor as defined in claim 5, wherein the bearing is a sintered oilless bearing.

8. A brushless motor comprising:

a rotor including a permanent magnet magnetized N pole and S pole alternately in a rotary direction;

a stator including a core facing the permanent magnet in a radial direction and wound with a coil, and a bearing rotatably supporting the rotor, wherein the permanent magnet has 16 magnetic poles, and the core has 12 salient poles, wherein the core has the salient poles at its ends, and ones of slot inclusive angles of the salient poles adjacent to each other have a slot inclusive angle A, a slot inclusive angle B1, a slot inclusive angle B2, and a slot inclusive angle C, and wherein, when a relation of A<B1<B2<C is found, the slot inclusive angles in one cycle of the core are arranged in the sequence of A-A-B1-B1-B2-C-C-C-B2-B2-B1-A- for producing a lateral pressure urging the rotor along a radial direction.

9. The brushless motor as defined in claim 8, wherein the core has a basic core shape having a uniform slot inclusive-angle θ, and the salient poles deviate from the basic core shape by a given angle β, and the slot inclusive-angle A, the slot inclusive-angles 81 and 82, and the slot inclusive-angle C, meet equations below:

$A=\theta-3\beta$ $B1=\theta-\beta$ $B2=\theta+\beta$ $C=\theta+3\beta.$

10. The brushless motor as defined in claim 8, wherein the bearing is a sintered oilless bearing.

11. The brushless motor as defined in claim 8, wherein a position detector for detecting the magnetic poles of the permanent magnet is disposed at a position of the slot inclusive-angle C.

12. A brushless motor comprising:

a rotor including a permanent magnet magnetized N pole and S pole alternately in a rotary direction;

a stator including a core facing the permanent magnet in a radial direction and wound with a coil, and a bearing rotatably supporting the rotor, wherein the permanent magnet has 16 magnetic poles, and the core has 12 salient poles, wherein the core has the salient poles at its ends, and the salient poles have a salient-pole inclusive-angle P, a salient-pole inclusive-angle Q1, a salient-pole inclusive-angle Q2, and a salient-pole inclusive-angle R, and wherein, when a relation of P<Q1<Q2<R is found, the salient-pole inclusive-angles in one cycle of the core are arranged in the sequence of P-P-Q1-Q1-Q2-R-R-R-Q2-Q2-Q1-P-for producing a lateral pressure urging the rotor along a radial direction.

13. The brushless motor as defined in claim 12, wherein the core has a basic core shape having a uniform salient-pole inclusive-angle λ, and the salient poles deviate from the basic core shape by a given angle β, and the salient-pole inclusive-angle P, the salient poles inclusive-angles Q1 and Q2, and the salient pole inclusive-angle R, meet equations below:

$P=\lambda-3\beta$ $Q1=\lambda-\beta$ $Q2=\lambda+3\beta$ $R=\lambda+3\beta.$

14. The brushless motor as defined in claim 12, wherein the bearing is a sintered oilless bearing.

* * * * *

UNITED STATES PATENT AND TRADEMARK OFFICE
CERTIFICATE OF CORRECTION

PATENT NO. : 7,327,064 B2  Page 1 of 1
APPLICATION NO. : 10/980464
DATED : February 5, 2008
INVENTOR(S) : Hiroyasu Fujinaka It is certified that error appears in the above-identified patent and that said Letters Patent is hereby corrected as shown below:

On the Title Page, Item (56), References Cited, FOREIGN PATENT DOCUMENTS: "JP 200106806 A 1/2001" should read -- JP 2001-16806 A 1/2001 --

In claim 9 at column 10, line 1, "angles 81 and 82" should read -- angles B1 and B2 --

Signed and Sealed this

Twenty-second Day of July, 2008

JON W. DUDAS
*Director of the United States Patent and Trademark Office*